(12) United States Patent
Cheung et al.

(10) Patent No.: US 6,618,461 B2
(45) Date of Patent: Sep. 9, 2003

(54) SYSTEMS AND METHODS TO ENHANCE PASSIVE CONTAINMENT COOLING SYSTEM (75) Inventors: Yee Kwong Cheung, San Jose, CA (US); Robert E. Gamble, Mountain View, CA (US); Atambir Singh Rao, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/781,455

(22) Filed: Feb. 12, 2001

(65) Prior Publication Data

US 2003/0048865 A1 Mar. 13, 2003

(51) Int. Cl.[7] .............................................. G21C 9/004
(52) U.S. Cl. ........................ 376/283; 376/282; 376/277; 376/296; 376/299
(58) Field of Search ................................. 376/283, 296, 376/299, 277, 282

(56) References Cited

U.S. PATENT DOCUMENTS

| | | | | |
|---|---|---|---|---|
| 5,008,069 A | * | 4/1991 | Fredell ........................ 376/299 |
| 5,106,571 A | * | 4/1992 | Wade et al. ................. 376/283 |
| 5,126,099 A | * | 6/1992 | Van Kuijk .................. 376/283 |
| 5,145,639 A | * | 9/1992 | Hui ............................ 376/283 |
| 5,158,742 A | * | 10/1992 | Dillmann .................... 376/299 |
| 5,169,595 A | * | 12/1992 | Cooke ........................ 376/282 |
| 5,276,720 A | | 1/1994 | Oosterkamp et al. ....... 376/283 |
| 5,282,230 A | | 1/1994 | Billig et al. ................ 376/283 |
| 5,295,168 A | * | 3/1994 | Gluntz et al. ............... 376/283 |
| 5,303,274 A | * | 4/1994 | Sawyer ...................... 376/283 |
| 5,353,318 A | | 10/1994 | Gluntz ....................... 376/283 |
| 5,377,243 A | * | 12/1994 | Hill ............................. 376/283 |
| 5,426,681 A | * | 6/1995 | Aburomia ................... 376/283 |
| 5,428,652 A | * | 6/1995 | Conrads et al. ............. 376/299 |
| 5,570,401 A | * | 10/1996 | Gluntz ....................... 376/283 |
| 5,596,613 A | * | 1/1997 | Gluntz et al. ............... 376/283 |
| 5,657,360 A | * | 8/1997 | Muta et al. ................. 376/277 |
| 5,761,262 A | | 6/1998 | No et al. .................... 376/298 |
| 5,887,043 A | * | 3/1999 | Spinks ....................... 376/298 |
| 6,069,930 A | * | 5/2000 | Gamble et al. ............. 376/282 |
| 6,097,778 A | | 8/2000 | Cheung ..................... 376/283 |
| 6,243,432 B1 | * | 6/2001 | Cheung et al. ............. 376/282 |
| 6,249,561 B1 | * | 6/2001 | Aburomia ................... 376/283 |

FOREIGN PATENT DOCUMENTS

| | | | |
|---|---|---|---|
| EP | 0 389 231 | 9/1990 | ........... G21C/15/18 |
| EP | 44 16 140 A1 | 11/1994 | ............ B01F/5/04 |
| JP | 0039996 | * 9/1985 | |
| JP | 1016991 | * 1/1989 | |
| JP | 3077096 | * 4/1991 | |
| JP | 3215792 | * 9/1991 | |
| JP | 404076494 | * 3/1992 | |
| JP | 404290994 A | * 10/1992 | |

OTHER PUBLICATIONS

EPO Search Report, Apr. 26, 2002, 3 pgs.

* cited by examiner

Primary Examiner—Michael J. Carone
Assistant Examiner—John Richardson
(74) Attorney, Agent, or Firm—Armstrong Teasdale LLP (57) ABSTRACT A nuclear reactor containment cooling system includes a containment vessel having a drywell and a wetwell, a cooling condenser submerged in a cooling pool of water located outside the containment vessel, a vent line extending from the condenser to a suppression pool disposed in the wetwell, and at least one drain line extending from the condenser to a condensate drain tank located in the drywell. An end of the drain line is vertically submerged below the surface of a pool of water in the drain tank. To enhance flow, a blower can be located in the drain line. The containment cooling system can include a drywell gas recirculation subsystem coupled to the vent line, and including a suction pipe coupled to the vent line, at least one valve located in the suction pipe, at least one blower coupled to the suction line, and a discharge pipe in flow communication with the drywell.

20 Claims, 5 Drawing Sheets

SYSTEMS AND METHODS TO ENHANCE PASSIVE CONTAINMENT COOLING SYSTEM

BACKGROUND OF THE INVENTION

This invention relates generally to nuclear reactors, and more particularly, to passive containment cooling systems in nuclear reactors.

One known boiling water reactor includes a reactor pressure vessel (RPV) positioned in a containment vessel and a passive containment cooling system (PCCS). The containment vessel includes a drywell and an enclosed wetwell disposed in the containment vessel. The PCCS includes a passive containment cooling condenser (PCC) submerged in a cooling pool located above the containment vessel.

In the event of a pipe break, steam generated by core decay heat is released from the RPV into the drywell. The steam has a pressure greater than the pressure within the wetwell and will, therefore, flow into the PCC inlet line carrying noncondensable gasses originally contained in the drywell. The steam is condensed in the condenser tube section, and the noncondensable gases are exhausted from the lower drum of the condenser via a gas vent line that discharges below the surface of the suppression pool in the wetwell. After rising through the suppression pool, the concondensable gases enter the wetwell air space above the suppression pool.

The condensate collected in the lower drum of the condenser drains to a drain tank or condensate storage tank via a drain line. A U-pipe loop seal or water trap restricts backflow of steam and noncondensable gasses in the drywell from flowing backwardly through the drain line back into the lower drum to bypass the condenser and enter the wetwell through the vent line. The drain tank has a separate injection line connected to the RPV to drain the condensate to the RPV. Inside the RPV, the condensate turns into steam by decay heat and the steam flows back to the drywell. This produces a continuous process by which the reactor core is cooled by water over a period of time following a pipe break.

However, the operation of continually returning noncondensible gasses to the wetwell results in a relatively high pressure in the containment. Also, incremental heating of the top layer of the suppression pool water each time noncondendsable gases are vented from the PCC into the wetwell can cause the pressure in the containment to slowly rise.

U.S. Pat. No. 5,282,230 to Billig et al. describes a bypass line connected to the drain line at a location above the U-pipe loop seal. The bypass line includes a normally closed bypass valve and discharges directly into the drywell. The bypass line channels the condensate and noncondensable gases from the lower drum through the top portion of the drain line and the bypass line for return to the drywell. Once the bypass valve is opened, the PCC operation relies on the natural circulation of steam being drawn into the condenser and the condensate falling by gravity back into the drywell. However, the long term removal rate of the PCC is controlled by the natural circulation, which can limit the rate of the post-accident recovery process. Also hydrogen gas generated by metal-water reaction in the reactor core could stay in the top portion if the intake pipe and PCC condenser and impede the natural circulation.

U.S. Pat. No. 6,097,778 to Cheung describes a passive gravity driven suction pump that converts the potential energy of the condensate to draw the condensable and noncondensable gases from the region downstream of the condenser tubes and discharge to the region outside the condenser. The advantage is that the device is passive, containing no moving parts, and does not use external power. However, the driving force, i.e., the potential energy, of the suction pump depends on the condensate drain rate. The condensate drain rate depends on the reactor decay power, which decreases over time after the reactor shut down, thereby, resulting in a reduced potential energy driving force of the suction pump.

It would be desirable to provide a containment cooling system for a nuclear reactor that has an enhanced flow through the condenser as compared to known passive containment cooling systems. Also it would be desirable to provide a containment cooling system for a nuclear reactor that effectively redistributes the noncondensible gases between the drywell and the wetwell.

BRIEF SUMMARY OF THE INVENTION

In an exemplary embodiment, a nuclear reactor containment cooling system includes a containment vessel having a drywell and a wetwell, a cooling condenser submerged in a cooling pool of water located outside the containment vessel, a vent line extending from the condenser to a suppression pool disposed in the wetwell, and at least one drain line extending from the condenser to a condensate drain tank located in the drywell. The condensate drain tank includes a pool of water, and an end of the drain line is vertically submerged below the surface of the pool of water in the drain tank. To enhance flow through the condenser, a blower is located in the drain line.

In another embodiment, to enhance flow through the condenser, a drain line can include a jet pump apparatus. The jet pump apparatus includes a suction line, a pump in flow communication with the suction line, a discharge line extending from the pump to a jet pump nozzle located inside the drain line, and a venturi section located in the drain line The jet pump nozzle is positioned upstream from the venturi section.

In another embodiment, to enhance flow, the containment cooling system includes a drywell gas recirculation subsystem coupled to the vent line. The gas recirculation subsystem includes a suction pipe coupled to, and in flow communication with the vent line, at least one valve located in the suction pipe, at least one blower coupled to the suction line, and a discharge pipe in flow communication with the drywell.

The above described nuclear reactor containment cooling system has an enhanced flow through the condenser as compared to known passive containment cooling systems. Also, the above described containment cooling system effectively redistributes the noncondensible gases between the drywell and the wetwell.

DETAILED DESCRIPTION OF THE INVENTION

Figure 1:
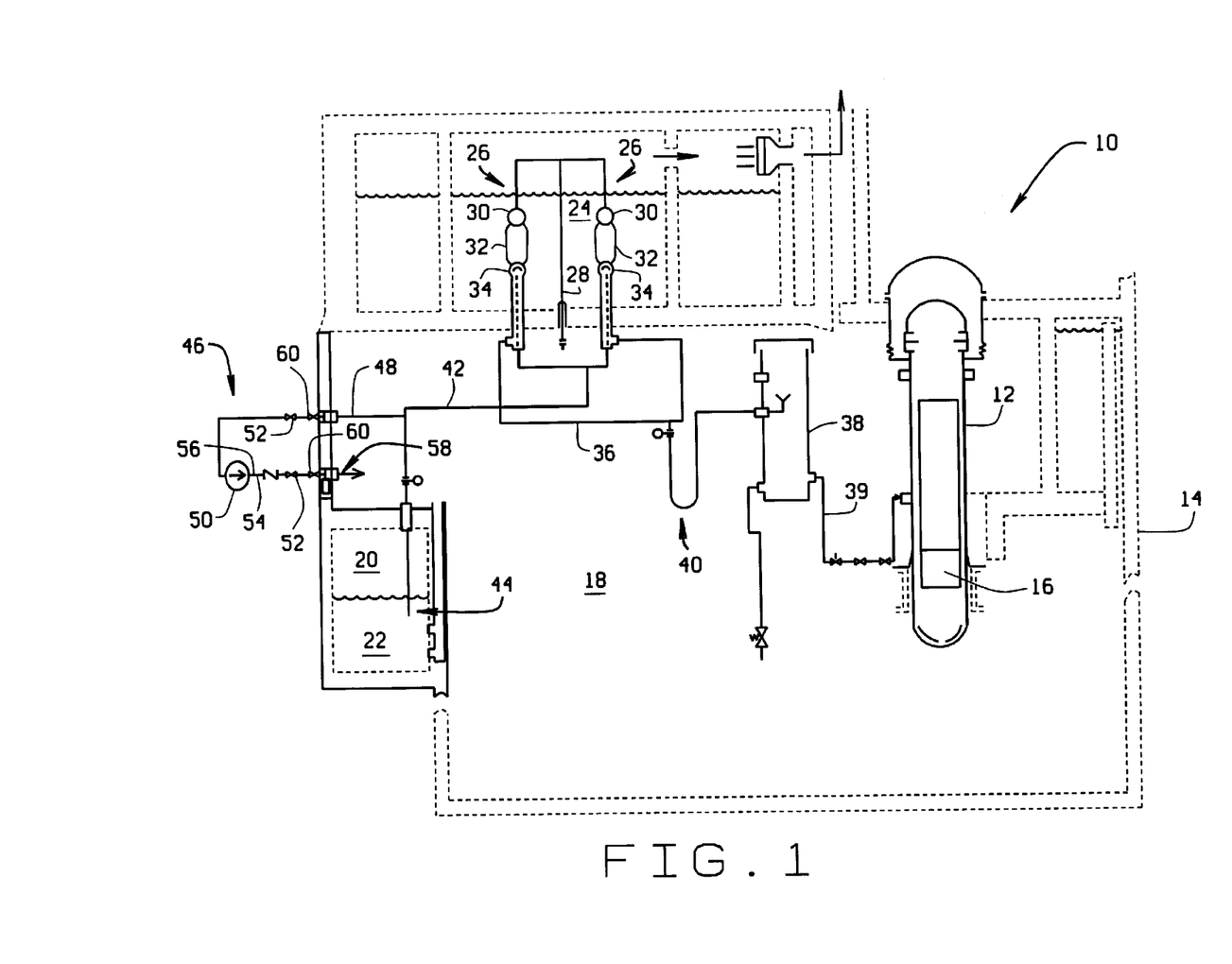
FIG. 1 is a schematic diagram of a nuclear reactor in accordance with an embodiment of the present invention.

FIG. 1 is a schematic diagram of a nuclear reactor 10 in accordance with an embodiment of the present invention. Reactor 10 includes a reactor pressure vessel 12 located inside a containment vessel 14. A reactor core 16 is located inside reactor pressure vessel 12.

Containment vessel 14 includes a drywell 18, which houses reactor pressure vessel 12, and an enclosed wetwell 20. A suppression pool 22 is located inside wetwell 20. A cooling condenser pool of water 24 is located outside containment vessel 14. A plurality (two shown) of containment cooling condensers 26 are submerged in cooling pool 24. Condenser 26 includes an inlet line 28 in fluid communication with drywell 18. Steam and noncondensible gases flow from drywell 18 through inlet line 28 to an upper drum 30 of condenser 26 and then into a condensing section 32 where the steam is condensed and collected in a lower drum 34. A condensate drain line 36 extends from lower drum 34 of condenser 26 to a condensate drain tank 38. An injection line 39 extends from condensate drain tank 38 to pressure vessel 12 and condensate drains to pressure vessel 12 through injection line 39. Drain line 36 includes a U-pipe loop seal or water trap 40 to restrict the backflow of steam and noncondensible gases from flowing backward through condensate drain line 36 and into condenser 26. A noncondensible gas vent line 42 extends from lower drum 34 to wetwell 20. An outlet end 44 of vent line 42 is submerged in suppression pool 22.

A drywell gas recirculation subsystem 46 prevents the buildup of noncondesible gases in wetwell 20. Drywell gas recirculation subsystem 46 includes a suction line 48 connected to and in fluid communication with noncondensible gas vent line 42 at a location downstream of condenser 26 and above outlet end 44 of vent line 42, one or more blowers 50 (one shown) connected to suction line 48, at least one valve 52 (two shown), and a discharge line 54. Discharge line 54 includes a first end 56 and a second end 58. First end 56 of discharge line 54 is connected to blower 50 and second end 58 is open to drywell 18. Valves 52 can be any suitable valves, for example, pyrotechic-type squib valves.

Blower 50 circulates the drywell atmosphere through condensers 26 by forced circulation. Particularly, the noncondensible gases circulate from condensing section 32 of condenser 26 through vent line 42 through suction line 48 and are returned to drywell 18, instead of discharging in wetwell 20.

Drywell gas recirculation subsystem 46, once actuated, remains as a closed loop extension of containment vessel 14. Locked open maintenance block valves 60 are located outboard of containment vessel 14 on suction line 48 and discharge line 54. Block valves 60 permit servicing of any component of subsystem 46 without the need for drywell entry.

Figure 2:
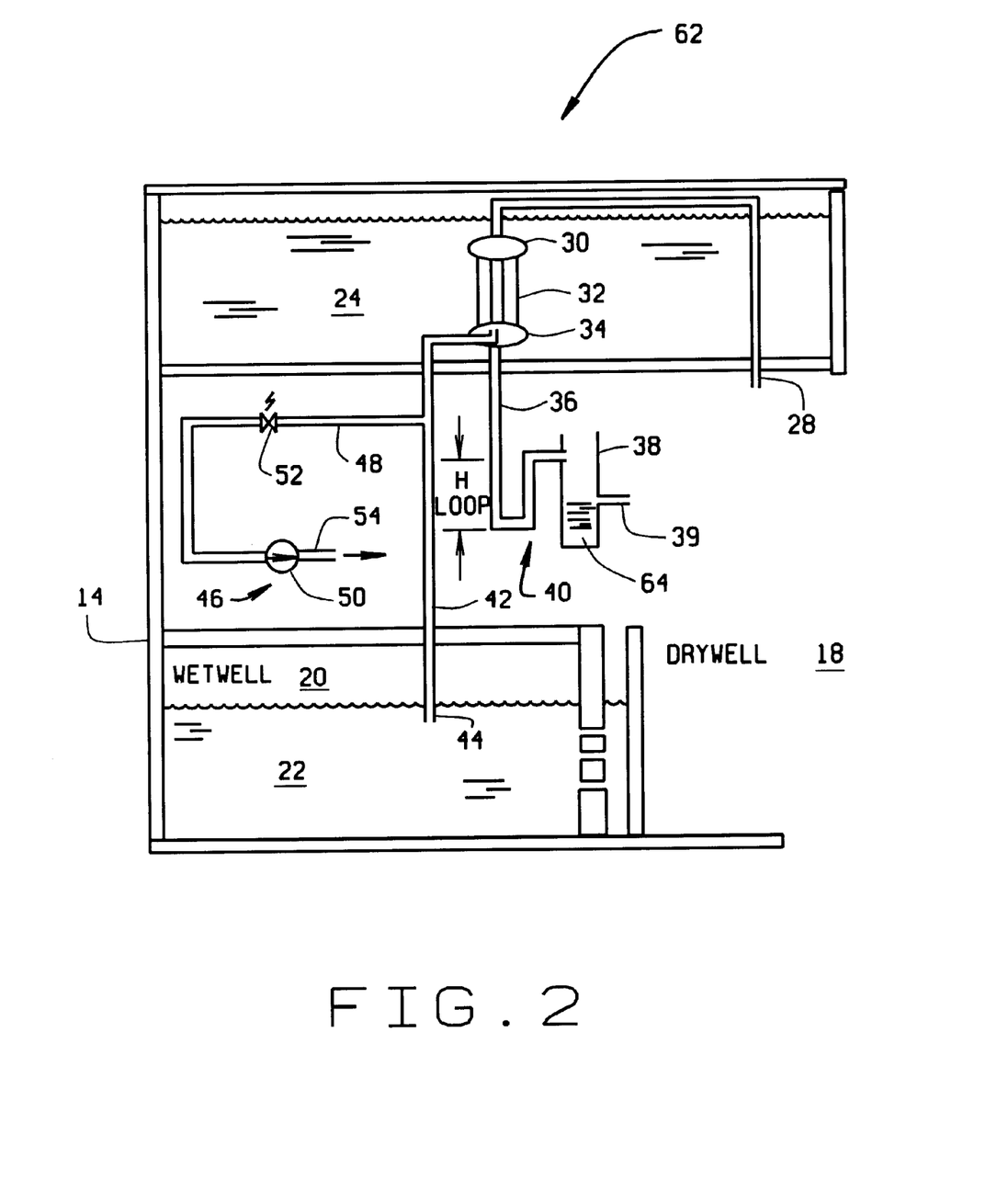
FIG. 2 is a schematic diagram of another embodiment of the containment cooling system shown in FIG. 1.

FIG. 2 is a schematic diagram of another embodiment of a containment cooling system 62 shown in FIG. 1. In this embodiment drywell gas recirculation subsystem 46 is located entirely inside containment vessel 14. As described above, containment cooling system 62 includes containment vessel 14 having a drywell 18 and a wetwell 20. Cooling condenser 26 is submerged in cooling pool 24 located outside containment 14. Condenser 26 includes inlet line 28 in fluid communication with drywell 18 and connected to upper drum 30, condensing section 32, and lower drum 34. Noncondensible gas vent line 42 extends from lower drum 34 of condenser 26 to wetwell 20 with outlet end 44 of vent line 42 submerged in suppression pool 22. Condensate drain line 36 extends from lower drum 34 of condenser 26 to condensate drain tank 38, and includes U-pipe loop seal 40. The height of loop seal 40 is defined as $H_{LOOP}$. Condensate drain tank 38 includes a pool of water 64, and condensate drain line 36 enters condensate drain tank 38 above the surface of pool 64.

Drywell gas recirculation subsystem 46 includes suction line 48 connected to and in fluid communication with noncondensible gas vent line 42, blower 50 connected to suction line 48, squib valve 52, and discharge line 54.

Figure 3:
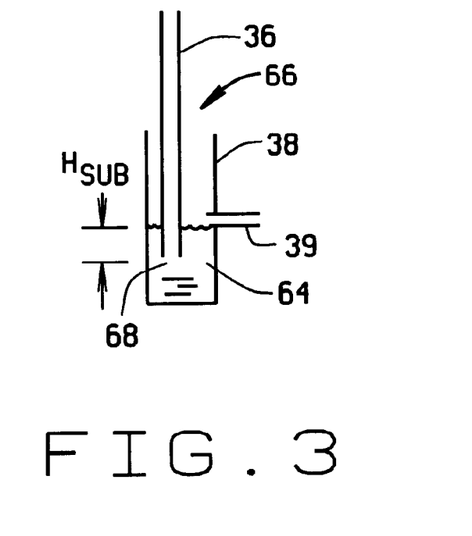
FIG. 3 is a schematic diagram of the loop seal portion of a containment cooling system in accordance with another embodiment of the present invention.

FIG. 3 is a schematic diagram of a straight pipe loop seal 66 of containment cooling system 62 in accordance with another embodiment of the present invention. In this embodiment, condensate drain line 36 is vertically submerged into drain tank 38 a distance $H_{SUB}$ below the surface of drain tank pool of water 64. The advantage of this arrangement is that the static head for the flow passing through drain line 36 is biased depending on the flow direction.

Defining the cross-sectional area of drain line 36 and drain tank 38 as $A_{PIPE}$ and $A_{TANK}$ respectively, and a forward flow direction as the flow of condensate and noncondensible gases from condenser 26 through drain line 36, into drain tank 38, and to drywell 18. For forward flow, the pressure inside drain line 36 needs to be greater than the pressure in drywell 18 to push down the water level inside drain line 36 to an outlet end 68 of drain line 36. The water level in drain tank 38 rises due to the incoming water volume from drain line 36. The submergence of drain line outlet end 68 becomes $H_{SUB}*(1+A_{PIPE}/(A_{TANK}-A_{PIPE}))$. This is the static head difference between the pressure in drain line 36 and the pressure in drywell 18 for the forward flow to occur. For an embodiment with $(A_{PIPE}/A_{TANK})>>1$, or for an embodiment where the water level in drain tank 38 is controlled by the location of injection line 39, the static head for the forward flow is $\cong H_{SUB}$.

The backward flow direction is defined as the flow from drywell 18, through drain tank 38 into drain line 36. For backward flow to occur, the pressure in drywell 18 has to be sufficiently greater than the pressure in drain line 36 to push down the water level inside tank 38 to drain line exit elevation. In this situation, the water level inside drain line 36 rises due to incoming water volume from drain tank 38. The length of the water column inside drain line 36 is $H_{SUB}*A_{TANK}/A_{PIPE}$. This is the static head difference between the pressure in drywell 18 and the pressure in drain line 36 for backward flow to occur.

By using the appropriate area ratio between drain tank 38 and drain line 36, the backward flow static head in straight pipe loop seal 66 (shown in FIG. 3) is $H_{SUB}*A_{TANK}/A_{PIPE}$, which can be greater than that in U-pipe loop seal 40 (shown in FIG. 2) of $2*H_{LOOP}$. For the same area ratio, the forward flow static head in straight pipe loop seal 66 is $H_{SUB}$, which can be a fraction of $H_{LOOP}$ in U-pipe loop seal 40 due to the area multiplication factor. Therefore, the advantage of straight pipe loop seal 66 shown in FIG. 3 is a lower static head for forward flow.

Figure 4:
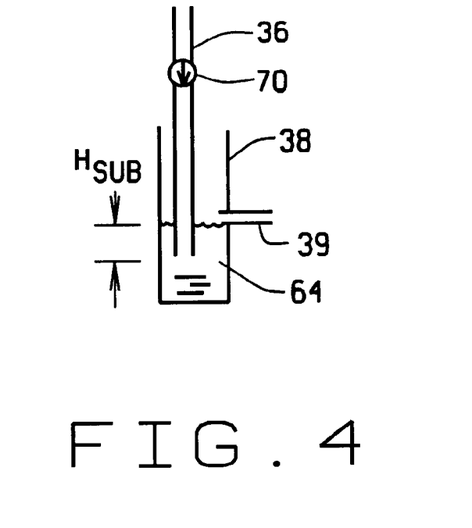
FIG. 4 is a schematic diagram of a portion of a containment cooling system showing a blower in the condenser drain line in accordance with another embodiment of the present invention.

FIG. 4 is a schematic diagram a portion of containment cooling system 62 that includes a blower 70 in condenser drain line 36 in accordance with another embodiment of the present invention. Blower 70 enhances the flow through condenser 26 and recirculates noncondensible gases back to drywell 18 through condensate drain tank 38. Blower 70 is connected to condensate drain line 36 at a location between lower drum 34 of condenser 26 (shown in FIG. 2) and drain tank pool of water 64. As explained above, the head requirement of blower 70 is less in a drain line 36 that is connected to drain tank 38 with a straight pipe loop seal 66 than a drain line 36 that is connected to drain tank 38 with a U-tube loop seal 40. In alternate embodiments, containment system 62 includes more than one blower 70 in drain line 36.

Figure 5:
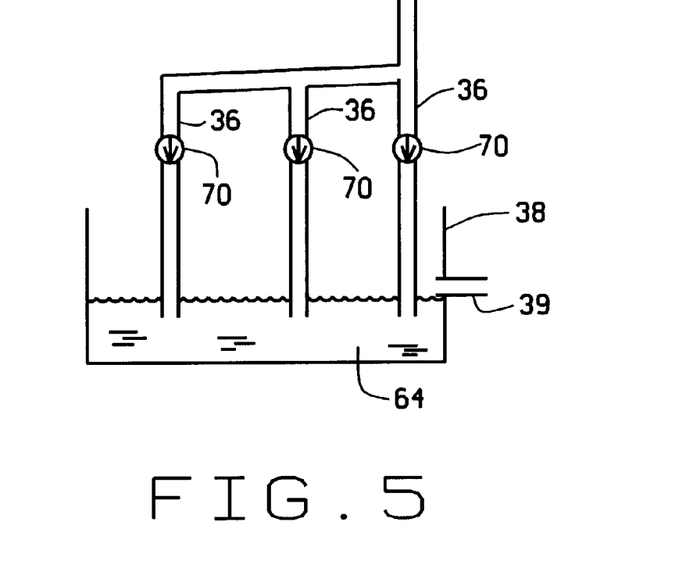
FIG. 5 is a schematic diagram of a portion of a containment cooling system showing three condensate drain lines with a blower in each line in accordance with another embodiment of the present invention.

FIG. 5 is a schematic diagram of a portion of containment cooling system 62 that includes three condensate drain lines 36 extending into drain tank 38 in accordance with another embodiment of the present invention. Each condensate drain line 36 includes a blower 70.

Figure 6:
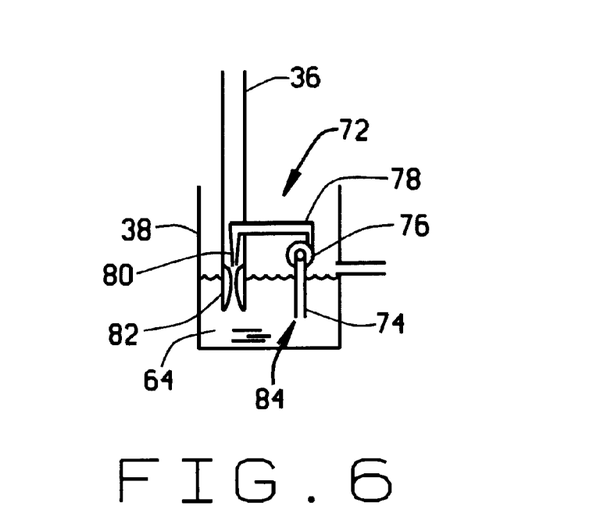
FIG. 6 is a schematic diagram of a portion of a containment cooling system showing a jet pump in a condensate drain line in accordance with another embodiment of the present invention.

FIG. 6 is a schematic diagram of a portion of containment cooling system 62 that includes a jet pump 72 in condensate drain line 36 in accordance with another embodiment of the present invention. Jet pump 72 includes a suction line 74, a pump 76 coupled to and in flow communication with suction line 74, a discharge line 78 extending from pump 76 to a jet pump nozzle 80 located inside drain line 36, and a venturi 82 located in drain line 36. Jet pump nozzle 80 is positioned upstream from venturi 82 in drain line 36. An end 84 of suction line 74 is positioned in condensate drain tank pool of water 64.

Jet pump suction line 74 takes water from drain tank 38 which is circulated by pump 76 through discharge line 78, and injected into venturi 82 in drain line 36 via jet pump nozzle 80 at high velocity. Low pressure is created in venturi 82 by the high jet velocity of the water. The mixture of condensate and noncondensible gases are drawn through venturi 82 and discharged into drain tank 38. The condensate is collected in drain tank 38 and the noncondensible gases are discharged back to drywell 18. As explained above, the head requirement of jet pump 72 is less in a drain line 36 that is connected to drain tank 38 with a straight pipe loop seal 66 than a drain line 36 that is connected to drain tank 38 with a U-tube loop seal 40. In alternate embodiments, drain line 36 includes more than one jet pump 72.

Figure 7:
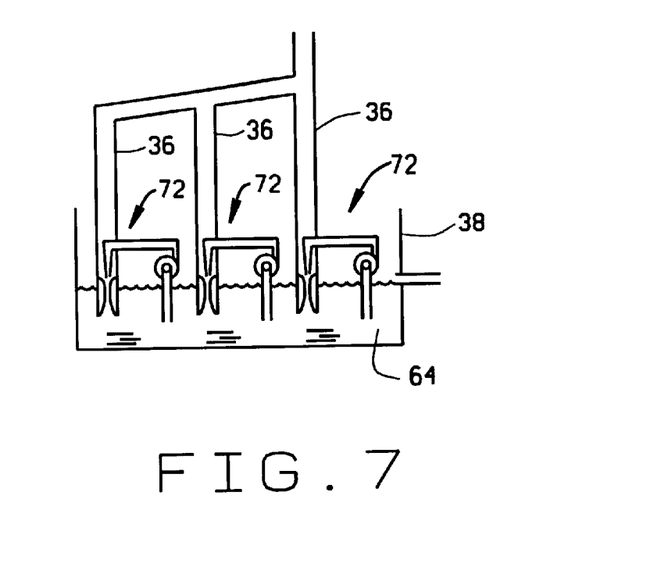
FIG. 7 is a schematic diagram of a portion of a containment cooling system showing three condensate drain lines with a jet pump in each line in accordance with another embodiment of the present invention.

FIG. 7 is a schematic diagram a portion of containment cooling system 62 that includes three condensate drain lines 36 extending into drain tank 38 in accordance with another embodiment of the present invention. Each condensate drain line 36 includes a jet pump 72.

Figure 8:
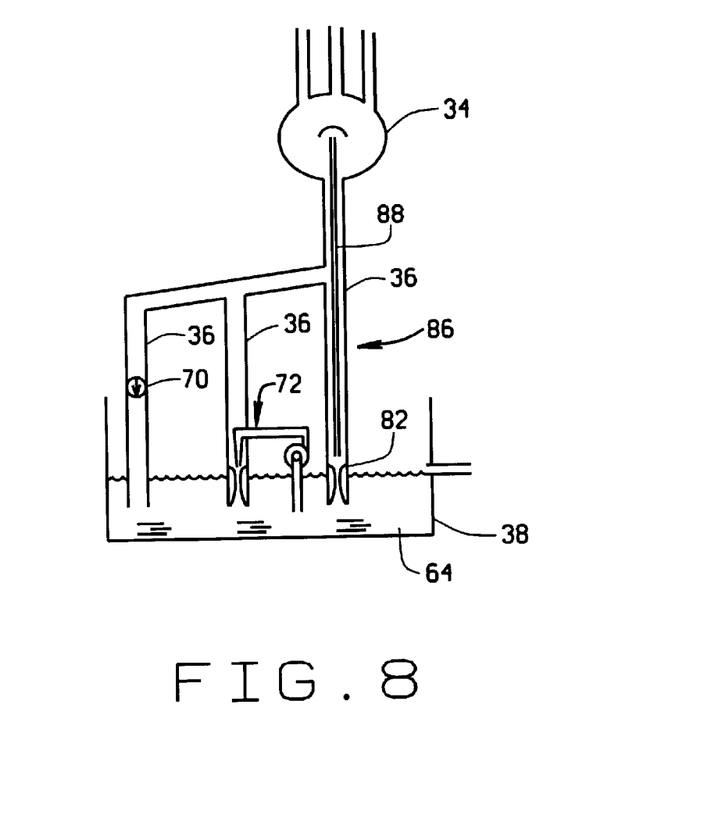
FIG. 8 is a schematic diagram a portion of a containment cooling system showing three condensate drain lines with a jet pump in one line, a blower in the second drain line, and a gravity driven suction pump in the third drain line in accordance with another embodiment of the present invention.

FIG. 8 is a schematic diagram a portion of a containment cooling system 62 showing three condensate drain lines 36 extending into drain tank 38. A jet pump 72 is located in one drain line 36, a blower 70 is located in a second drain line 36, and a gravity driven suction pump 86 is located in a third drain line 36 in accordance with another embodiment of the present invention. Gravity driven suction pump 86 includes a suction line 88 extending from lower drum 34 of condenser 26 into venturi section 82 of drain line 36. Gravity driven suction pumps are described in greater detail in U.S. Pat. No. 6,097,778.

The above described nuclear reactor containment cooling system 62 enhances flow through condenser 26 as compared to known passive containment cooling systems. Also, the above described containment cooling system 62 effectively redistributes the noncondensible gases between drywell 18 and wetwell 20.

While the invention has been described in terms of various specific embodiments, those skilled in the art will recognize that the invention can be practiced with modification within the spirit and scope of the claims.

What is claimed is:

1. A nuclear reactor containment cooling system comprising:
    a containment vessel comp sing a drywell and an enclosed wetwell;
    a cooling condenser submerged in a cooling pool of water, said cooling pool of water located outside the containment vessel;
    a vent line extending from s id condenser to a suppression pool disposed in said wetwell;
    at least one drain line extending from said condenser to a condensate drain tank located in said drywell, said condensate drain tank comprising a pool of water, said at least one drain line in flow communication with said condensate drain tank; and
    a drywell gas recirculation subsystem coupled to said vent line, said gas recirculation subsystem located inside said drywell, said gas recirculation subsystem located inside said drywell and in fluid communication with non-condensible gases in said wetwell, comprising:
        a suction pipe coupled to, a d in flow communication with said vent line;
        at least one valve located in said suction pipe;
        at least one blower coupled o said suction line; and
        a discharge pipe in flow communication with said drywell.

2. A containment cooling system in accordance with claim 1 further comprising a blower located in said least one drain line.

3. A containment cooling system in accordance with claim 2 wherein each drain line comprises a U-pipe loop seal, said end of said drain line located above said surface of said pool of water in said drain tank.

4. A containment cooling system in accordance with claim 1 further comprising at least one jet pump apparatus, each jet pump apparatus comprising:
    a suction line;
    a pump in flow communication with said suction line;
    a discharge line extending from said pump to a jet pump nozzle located inside a drain line; and
    a venturi section located in said drain line, said jet pump nozzle positioned upstream of said venturi section.

5. A containment cooling system in accordance with claim 4 wherein each drain line comprises a U-pipe loop seal, said end of said drain line located above said surface of said pool of water in said drain tank, said venturi section located at an entrance to said loop seal.

6. A containment cooling system in accordance with claim 1 wherein said at least one drain line comprises at least three drain lines in flow communication with said cooling condenser, at least one drain line of said at least three drain lines comprising a blower, at least one drain line of said at least three drain lines comprising a jet pump apparatus, and at least one drain line of said at least three drain lines comprising a gravity driven suction pump.

7. A containment cooling system in accordance with claim 6 wherein said at least one drain line comprises at least three drain lines in flow communication with said cooling condenser, at least one drain line of said at least three drain lines comprising a blower.

8. A containment cooling system in accordance with claim 6 wherein said at least one drain line comprises at least three drain lines in flow communication with said cooling condenser, at least one drain line of said at least three drain lines comprising a jet pump apparatus.

9. A containment cooling system in accordance with claim 1 wherein each drain line comprises a U-pipe loop seal, said end of said drain line located above said surface of said pool of water in said drain tank.

10. A nuclear reactor accordance with claim 9 wherein an end of said at least one drain line is vertically submerged below a surface of said pool of water in said drain tank, said end comprising a straight section of drain line extending from above the surface of the pool.

11. A nuclear reactor in accordance with claim 10 further comprising a blower located in said at least one drain line.

12. A nuclear reactor in accordance with claim 1 wherein an end of said at least one drain line is vertically submerged below a surface of said pool of water in said drain tank, said end comprising a straight section of drain line extending from above the surface of the pool.

13. A nuclear reactor comprising:
   a reactor pressure vessel;
   a reactor core located inside aid reactor pressure vessel;
   a containment vessel comprising a drywell and an enclosed wetwell, said reactor pressure vessel located inside said containment vessel;
   a cooling condenser submerged in a cooling pool of water, said cooling pool of water located outside the containment vessel;
   a vent line extending from said condenser to a suppression pool disposed in said wetwell;
   at least one drain line extending from said condenser to a condensate drain tank located in said drywell, said condensate drain tank comprising a pool of water, said at least one drain line in flow communication with said condensate drain tank; and
   a drywell gas recirculation subsystem coupled to said vent line, said gas recirculation subsystem located inside said drywell, said gas recirculation subsystem located inside said drywell and in fluid communication with non-condensible gases in said wetwell, comprising:
      a suction pipe coupled to, and in flow communication with said vent line;
      at least one valve located in said suction pipe;
      at least one blower coupled to said suction line; and
      a discharge pipe in flow communication with said drywell.

14. A nuclear reactor in accordance with claim 11 wherein each drain line comprises a U-pipe loop seal, said end of said drain line located above said surface of said pool of water in said drain tank.

15. A nuclear reactor in accordance with claim 13 further comprising at least one jet pump apparatus, each jet pump apparatus comprising:
   a suction line;
   a pump in flow communication with said suction line;
   a discharge line extending from said pump to a jet pump nozzle located inside a drain line; and
   a venturi section located in said drain line, said jet pump nozzle positioned upstream of said venturi section.

16. A nuclear reactor in accordance with claim 15 wherein each drain line comprises a U-pipe loop seal, said end of said drain line located above said surface of said pool of water in said drain tank, said venturi section located at an entrance to said loop seal.

17. A nuclear reactor in accordance with claim 13 wherein said at least one drain line comprises at least three drain lines in flow communication with said cooling condenser, at least one drain line of said at least three drain lines comprising a blower, at least one drain line of said at least three drain lines comprising a jet pump apparatus, and at least one drain line of said at least three drain lines comprising a gravity driven suction pump.

18. A nuclear reactor in accordance with claim 14 wherein said at least one drain line comprises at least three drain lines in flow communication with said cooling condenser, at least one drain line of said at least three drain lines comprising a blower.

19. A nuclear reactor in accordance with claim 17 wherein said at least one drain line comprises at least three drain lines in flow communication with said cooling condenser, at least one drain line of said at least three drain lines comprising a jet pump apparatus.

20. A nuclear reactor in accordance with claim 13 wherein each drain line comprises a U-pipe loop seal, said end of said drain line located above said surface of said pool of water in said drain tank.

* * * * *

UNITED STATES PATENT AND TRADEMARK OFFICE
CERTIFICATE OF CORRECTION

PATENT NO.     : 6,618,461 B2
DATED          : September 9, 2003
INVENTOR(S)    : Yee Kwong Cheung et al.

It is certified that error appears in the above-identified patent and that said Letters Patent is hereby corrected as shown below:

Column 6,
Line 18, delete "comp sing" insert therefor -- comprising --.
Line 24, delete "s id" insert therefor -- said --.
Line 36, delete "a d" insert therefor -- and --.
Line 39, delete "o" insert therefor -- to --.
Line 43, delete "1" insert therefor -- 12 --.

Column 7,
Line 19, delete "9" insert therefor -- 13 --.
Line 26, delete "nuclear reactor" insert therefor -- containment cooling system --.
Line 33, delete "aid" insert therefor -- said --.

Column 8,
Line 35, delete "14" insert therefor -- 17 --.

Signed and Sealed this

Fourth Day of May, 2004

JON W. DUDAS
*Acting Director of the United States Patent and Trademark Office*